United States Patent
Jain et al.

(10) Patent No.: US 10,289,532 B2
(45) Date of Patent: May 14, 2019

(54) METHOD AND SYSTEM FOR PROVIDING DELTA CODE COVERAGE INFORMATION

(71) Applicant: OPSHUB, INC., Palo Alto, CA (US)

(72) Inventors: Sandeep Jain, Palo Alto, CA (US); Hardik Shah, Ahmedabad (IN)

(73) Assignee: OPSHUB, INC. CA (US)

( * ) Notice: Subject to any disclaimer, the term of this patent is extended or adjusted under 35 U.S.C. 154(b) by 0 days.

(21) Appl. No.: 14/682,064

(22) Filed: Apr. 8, 2015

(65) Prior Publication Data
US 2016/0299835 A1    Oct. 13, 2016

(51) Int. Cl.
*G06F 11/36* (2006.01)

(52) U.S. Cl.
CPC ...... *G06F 11/3676* (2013.01); *G06F 11/3684* (2013.01)

(58) Field of Classification Search
CPC .............. G06F 11/3688; G06F 11/3676; G06F 11/3684
See application file for complete search history.

(56) References Cited

U.S. PATENT DOCUMENTS

| | | | |
|---|---|---|---|
| 9,442,830 B1* | 9/2016 | Zhang | G06F 11/3688 |
| 2005/0165760 A1* | 7/2005 | Seo | G06F 8/71 |
| 2016/0085663 A1* | 3/2016 | Best | G06F 11/3684 |
| | | | 714/38.1 |

* cited by examiner

*Primary Examiner* — Wei Y Zhen
*Assistant Examiner* — Amir Soltanzadeh
(74) *Attorney, Agent, or Firm* — Barry Choobin; Patent 360 LLC

(57) ABSTRACT

The various embodiments herein disclose a system and method for generating a delta code coverage information. The system for generating delta code coverage information comprises, a source control module configured for storing a plurality of software program code files to be processed and a plurality of code coverage data corresponding to the plurality of software program code files, a processor configured to generate a delta code coverage data for analysis for each of the plurality of software program code files on a line level or at a branch level by performing a time based delta code coverage process and a path based delta code coverage process.

11 Claims, 5 Drawing Sheets

METHOD AND SYSTEM FOR PROVIDING DELTA CODE COVERAGE INFORMATION

BACKGROUND

Technical Field

The embodiments herein generally relates to computer software and particularly relates to a testing of computer software. The embodiments herein more particularly relates to a method of obtaining code coverage data for only those lines of code which have changed in the given period of time or between a given set of file versions. The embodiments herein is further related to a system and method for providing a discriminated code coverage information.

Description of the Related Art

In computer software, code coverage refers to a measure used to describe the degree to which the source code of a program is tested by a particular test suite. A program with high code coverage has been more thoroughly tested and has a lower chance of containing the software bugs than a program with low code coverage. Code coverage was among the first methods invented for systematic software testing.

One of the conventional code coverage methods provide data that includes information such as the percentage of source code which is covered during testing, percentage of program subroutines, percentage and number of program statements, percentage and number of branches called during the execution of the test suit and the like.

However, only overall code coverage data is not sufficient to take appropriate judgment about potential risks of defects in an application, as large applications contain large number of source code lines, which makes it difficult and time consuming to get high code coverage on all the lines of code. Further, the source code lines (and branches) that are not changed between two given versions and where the old version of the application has been deployed and used in production can be assumed to work effectively and have lower risk of having bugs. Therefore, it is essential to focus the testing and code coverage effort on the source codes lines and branches that have been changed between the given two or more versions to obtain a useful code coverage data for high risk lines and branches.

Hence, there is a need for a method and system to provide delta code coverage information on a line level or branch level. Further, there is a need for a method and system to provide a time based delta code coverage information. Still further there is need for a method and system to provide a specific path based delta code coverage information. Still further there is need for a method and system to provide a discriminated code coverage information. Still further there is a need for a method and system for generating code coverage results for changed lines.

Hence, there is a need for a method and system that overcomes the above mentioned disadvantages. The above mentioned shortcomings, disadvantages and problems are addressed herein and which will be understood by reading and studying the following specification.

OBJECTS OF THE EMBODIMENTS HEREIN

The primary object of the embodiments herein is to provide delta code coverage information on a line level or branch level.

Another object of the embodiments herein is to provide time-based delta code coverage information on a line level or branch level.

Yet another object of the embodiments herein is to provide specific path-based delta code coverage information on a line level or branch level.

Yet another object of the embodiments herein is to provide patched software having good code coverage of the changed code.

Yet another object of the embodiments herein is to reduce the testing cycle time of the software code by focusing on areas which have changed in the given time or versions and which does not have high code coverage.

Yet another object of the embodiment s herein is to identify at the time of release whether all the high risk code changes have been effectively tested by calculating delta code coverage of high risk code lines, branches and files.

Yet another object of the embodiments herein is to develop a method and system to provide a discriminated code coverage information.

Yet another object of the embodiments herein is to develop a method and system for generating code coverage results for changed lines.

These and other objects and advantages of the embodiments herein will become readily apparent from the following detailed description taken in conjunction with the accompanying drawings.

SUMMARY

The embodiments herein provide a method and system to provide a discriminated code coverage information at line and branch level. Further, the discriminated code coverage information is aggregated at file and group of files level. The embodiments herein provide a method and system for generating code coverage results for changed lines. The delta code coverage defines a code coverage for the code changed between two given versions of a file.

According to one embodiment herein, a computer implemented system is provided for generating delta code coverage information by processing code coverage information corresponding to software program code files. The system comprises a source control module configured for storing a plurality of software program code files to be processed and a plurality of code coverage data, corresponding to the plurality of software program code files. A processor is configured to generate a delta code coverage data for analysis for each of the plurality of software program code files on a line level or at a branch level by performing a preset process.

According to an embodiment herein, the delta code coverage data is a subset of full code coverage data for analysis. The delta code coverage data on the line level indicates whether a line that is changed between the initial and the target versions has been executed. The delta code coverage data at a branch level indicates whether a branch that is changed between the initial and target versions has been executed.

According to an embodiment herein, the preset process includes a time based delta code coverage process and a path based delta code coverage process.

According to an embodiment herein, the time based delta code coverage process is executed to acquire the code coverage data for the lines that are changed within a preset time in one software program code file. According to an embodiment herein, the time based delta code coverage process is executed to acquire the delta code coverage of source code files that are changed for a plurality of times in a preset time period and the preset time is configured or customized by the user.

According to an embodiment herein, a path based delta code coverage process is performed to obtain a delta code coverage with respect to a preset project folder to acquire delta code coverage for changed lines in source files and which are changed between the initial and target versions of those files as represented by the two paths.

According to an embodiment herein, a computer implemented system is provided for generating delta code coverage information by processing code coverage information corresponding to software program code files. The system comprises a source control module configured for storing a plurality of software program code files to be processed and a plurality of code coverage data corresponding to the plurality of software program code files. A processor is configured to generate a delta code coverage data for analysis for each of the plurality of software program code files on a line level or at a branch level by performing a time based delta code coverage process and a path based delta code coverage process.

According to an embodiment herein, the delta code coverage data is a subset of full code coverage data for analysis. The delta code coverage data on the line level indicates whether a line that is changed has been executed. The delta code coverage data at a branch level indicates whether a branch that is changed has been executed.

According to an embodiment herein, the time based delta code coverage process is executed to acquire the code coverage data that are changed within a preset time in one software program code file. According to an embodiment herein, the time based delta code coverage process is executed to acquire the delta code coverage of source code files that are changed for a plurality of times in a preset time period and the preset time is configured or customized by the user to change a configuration parameter. According to an embodiment herein, the time based delta code coverage process is executed to acquire a frequency of change of codes in the preset time.

According to an embodiment herein, a path based delta code coverage process is performed to obtain a delta code coverage with respect to a preset project folder to indicate delta code coverage at line and branch levels for the lines which are changed in two versions.

According to an embodiment herein, the processor is configured to perform the path based delta code coverage process to obtain a delta code coverage with respect to a preset project folder to acquire delta code coverage for changed lines which are changed between the two versions of those files as represented by the two paths. According to an embodiment herein, the two versions are an initial version and a target version or a preset modified version and target version.

According to an embodiment herein, the system further comprises a retriever which is configured to retrieve a first path information corresponding to a path of the initial version of the software program code file and a second path information corresponding to a path of the target version of the software program code file from the source control module, during the execution of the path based delta code coverage process.

According to an embodiment herein, the system further comprises a comparator which is configured to compare the retrieved first path information and the second path information to compute a difference between the initial version of the software program code file and the target version of the software program code file to generate a second comparison data during the execution of the path based delta code coverage process to indicate the files that are changed between the initial version of the software program code file and the target version of the software program code file, and the line numbers that are changed between the initial version of the software program code file and the target version of the software program code file.

According to an embodiment herein, the processor is configured to generate a delta code coverage information by integrating the second comparison information with the corresponding code coverage data. According to an embodiment herein, the delta code coverage information indicates a total number of modified lines that are covered during the time based delta code coverage process, and number of branch statements of modified lines that are covered during the execution of the path based delta code coverage process.

According to an embodiment herein, a computer implemented method executed on a computing device for generating delta code coverage information by processing code coverage information corresponding to software program code files, is provided. The method comprises storing a plurality of software program code files and a corresponding code coverage data in a source control module. A query is generated and transmitted to the source control module from a query generator.

The software program code files are retrieved with a retriever module based on the transmitted query from the source control module. The retrieved software program code files are processed with a processor to generate a delta code coverage data for analysis for each of the plurality of software program code files on a line level or at a branch level by performing a time based delta code coverage process and a path based delta code coverage process.

According to an embodiment herein, the delta code coverage data is a subset of full code coverage data for analysis. According to an embodiment herein, the delta code coverage data on the line level indicates whether a line that is changed between the initial and the target versions has been executed. According to an embodiment herein, the delta code coverage data at a branch level indicates whether a branch that is changed between the initial and the target versions has been execute. According to an embodiment herein, the time based delta code coverage process is executed to acquire the code coverage data that are changed within a preset time in one software program code file. According to an embodiment herein, the time based delta code coverage process is executed to acquire the delta code coverage of source code files that are changed for a plurality of times in a preset time period. According to an embodiment herein, the preset time is configured or customized by the user to change a configuration parameter. According to an embodiment herein, the time based delta code coverage process is executed to acquire the frequency of change of codes in the preset time. According to an embodiment herein, the path based delta code coverage process is performed to obtain a delta code coverage with respect to a preset project folder to indicate delta code coverage at line and branch level for the lines which are changed in two versions.

According to an embodiment herein, the time based delta code coverage process comprises the steps of generating and transmitting a query to the source control module from the query. According to an embodiment herein, the query is generated based upon at least one pre-determined parameter corresponding to the software program code files during an execution of time based delta code coverage process. The pre-determined parameter corresponds to a modification time stamp corresponding to each of said software program code files.

According to an embodiment herein, two versions of the software program code files are retrieved based on the modification time stamps during the execution of time based delta code coverage process from the source control module by a retriever. According to an embodiment herein, the two versions are an initial modified version and a target version or a modified version with a preset time stamp and a target version.

According to an embodiment herein, the two versions of software program code file in the predetermined time period are compared with a comparator, to compute a difference between the two versions of software program code file in the predetermined time period to generate a first comparison information during the execution of time based delta code coverage process. According to an embodiment herein, the first comparison information indicates a line number of added or deleted or modified lines in the initial or predetermined version of the software program code file, that are modified again in the target version of the corresponding software program code files.

According to an embodiment herein, a delta code coverage information is generated by the processor by integrating the first comparison information with the corresponding code coverage data. The delta code coverage information indicates a total number of modified lines that are covered during the time based delta code coverage process, and number of branch statements of modified lines that are covered during the execution of the time based delta code coverage process.

According to an embodiment herein, the path based delta code coverage process is performed by the processor to generate a delta code coverage data with respect to a preset project holder. According to an embodiment herein, the processor is configured to compare a patched code of the target version of software program code file with a code of the initial version a software program code file to generate a delta code coverage data for the lines or branches that are changed between the two versions specified by folder paths in one or more software program code file. According to an embodiment herein, the two specified versions includes an initial version, a target version or a specified version.

According to an embodiment herein, the path based delta code coverage process comprises retrieving a first path information corresponding to a path of the initial version of the software program code file and a second path information corresponding to a path of the target version of the software program code file from the source control module by the retriever, during the execution of the path based delta code coverage process.

According to an embodiment herein, the path based delta code coverage process further comprises comparing the retrieved first path information and the second path information by a comparator to compute a difference between the initial version of the software program code file and the target version of the software program code file to generate a second comparison data during the execution of the path based delta code coverage process to indicate the files that are changed between the initial version of the software program code file and the target version of the software program code file, and the line numbers that are changed between the initial version of the software program code file and the target version of the software program code file.

According to an embodiment herein, the delta code coverage information is generated in the path based delta code coverage process by integrating the second comparison information with the corresponding code coverage data. According to an embodiment herein, the delta code coverage information indicates a total number of modified lines that are covered during the time based delta code coverage process, and number of branch statements of modified lines that are covered during the execution of the path based delta code coverage process.

According to an embodiment herein, a computer implemented system is provided for generating delta code coverage information by processing code coverage information corresponding to software program code along with the information about code changes. The system comprises a source control module configured for storing a plurality of software program code files to be processed and a plurality of code coverage data corresponding to the plurality of software program code lines contained in those files. A processor is configured to generate a delta code coverage data for analysis for each of the plurality of software program code files on a line level or at a branch level.

According to an embodiment herein, the delta code coverage is computed based on a plurality of parameters. The plurality of the parameters include but are not limited to the overall code coverage report, the version of the file at the beginning, and the version of the file at the end. According to an embodiment herein, the difference between the two versions of the file provides the list of the lines that have changes that are added or deleted. Further, the difference between the two versions of the file is cross referenced against a code coverage report containing the line and branch coverage data for that file to obtain a delta code coverage report. According to an embodiment herein, the two versions of the file are initial version and a final version used for delta coverage computation.

According to an embodiment herein, the delta code coverage data is a subset of full code coverage data for analysis. The delta code coverage data on the line level indicates whether a line in the first version and a line in the target version of a file that is changed has been executed. The delta code coverage data at a branch level indicates whether a branch that is changed has been executed.

According to an embodiment herein, the time based delta code coverage process is executed to acquire the code coverage data for the code that has changed within a given time period in one set of software program code file. The preset time period is set by a user.

According to an embodiment herein, the time based delta code coverage process is executed to acquire the delta code coverage of source code files that are changed for a plurality of times in a preset time period to improve a software quality of the source code files and wherein the preset time is configured or customized by the user to change a configuration parameter.

According to an embodiment herein, a path based delta code coverage process is performed to obtain a delta code coverage with respect to a preset project folders to indicate changed codes to judge the codes that are changed between the first path version and second path version.

According to an embodiment herein, the system further comprises a query generator configured to generate and transmit a query to the source control module. The query is generated based upon at least one pre-determined parameter corresponding to the two versions of software program code files during an execution of time based delta code coverage process. The pre-determined time period start and time period end (and when source code repository has multiple branches, then corresponding branch information) parameter corresponds to a modification time stamp corresponding to each version of the software program code files. The query generator is communicably coupled to the processor and the processor is configured to process the two versions of the software program code files in accordance with the pre-determined criteria specified by the query. The two versions of the software program code files are the initial version and a final version or a changed version of the same software program code file.

According to an embodiment herein, the initial version is the version of the file is the file with the highest version having the timestamp of the initial time period or earlier.

According to an embodiment herein, the target version of the file is the file with the highest version having the timestamp of the final time in the period or earlier.

According to an embodiment herein, a retriever is configured to retrieve from the source control module, the appropriate version of software program code files during the execution of time based delta code coverage process.

According to an embodiment herein, a comparator configured to compare a predetermined version of software program code file and the target versions of the corresponding software program code file in the predetermined time period, to compute a difference between the retrieved predetermined version of software program code file and the target version of the corresponding software program code file in the predetermined time period, to generate a first comparison information during the execution of time based delta code coverage process. The first comparison information indicates a line number of new, modified or deleted in the target version of the corresponding software program code files when compared with the initial version of the software program code file. According to an embodiment herein, similarly a branch level comparison of the two versions is done to generate the list of changed code branches.

According to an embodiment herein, the processor is configured to generate a delta code coverage information by integrating the first comparison information with the corresponding code coverage data. The delta code coverage information indicates whether a line or branch which has been changed between the initial and target version has been executed. Further, the delta code coverage information also indicate a total number of modified lines that are covered during the time based delta code coverage process and the number of branch statements of modified branches that are covered during the execution of the time based delta code coverage process.

According to an embodiment herein, the processor is configured to generate a delta code coverage report for each software program code file identifying changed line numbers in each file and the code coverage for that changed line. In one embodiment this can be indicated by highlighting the code with a predefined color scheme or color code.

According to an embodiment herein, the processor is configured to perform the path based delta code coverage process to generate a delta code coverage data between the two versions of the file specified by two paths with respect to a preset project holder.

According to an embodiment herein, the processor is configured to compare changed version of code of the software program code file to a first released version code of a software program code file to generate a delta code coverage data of a portion the software program code file, and the portion of the software program code file is changed in the new version.

According to an embodiment herein, the delta code coverage data generated indicates a changed code between two versions which is changed and which is not executed and requires attention and observation.

According to an embodiment herein, the retriever is configured to retrieve a first path information corresponding to a path of the first released version of the software program code file and a second path information corresponding to a path of the target version of the software program code file from the source control module, during the execution of the path based delta code coverage process.

According to an embodiment herein, the comparator is configured to compare the retrieved first path information and the second path information to compute a difference between the first released version of the software program code file and the patched version of the software program code file to generate a second comparison data during the execution of the path based delta code coverage process to indicate the files that are changed between the first released version of the software program code file and the patched version of the software program code file, and the line numbers and branches that are changed between the first released version of the software program code file and the patched version of the software program code file.

According to an embodiment herein, the processor is configured to generate a delta code coverage information by integrating the second comparison information with the corresponding code coverage data. The delta code coverage information indicates individual lines and branches and a total number of modified lines and branches that are covered daring the time or path based delta code coverage process, and number of branch statements of modified branches that are covered during the execution of the time or path based delta code coverage process.

According to an embodiment herein, a computer implemented method is executed on a computing device for generating delta code coverage information by processing code coverage information corresponding to software program code files. The method comprises the following steps. A plurality of software program code files are stored in a source control module. A corresponding code coverage data of the plurality of software program code files are provided as a separate input. A query is generated with a query generator and the generated query is transmitted to the source control module. The software program code files are retrieved from the source control module based on the transmitted query. The retrieved software program code files are processed to generate a delta code coverage data for analysis for each of the plurality of software program code files on a line level or at a branch level or both by performing a delta code coverage process. The delta code coverage process includes a time based delta code coverage process or a path based delta code coverage process.

According to an embodiment herein, the delta code coverage data is a subset of full code coverage data for analysis. The delta code coverage data on the line level indicates whether a line that is changed between the two specified versions has been executed. The delta code coverage data at a branch level indicates whether a branch that is changed between the two specified versions has been executed. The time based delta code coverage process is executed to acquire the delta code coverage data for lines or branches that are changed within a preset time in one or more software program code files. The preset time is set by a user, and wherein the path based delta code coverage process is executed to acquire the delta code coverage data for the lines or branches that are changed between the two versions specified by folder paths in one or more software program code file. According to an embodiment herein, the two specified versions includes an initial version, a target version or a specified version.

According to an embodiment herein, the versions of files that correspond to the beginning and the ending time of the time period are retrieved in the time based delta code coverage process.

According to an embodiment herein, the time based delta code coverage process comprises the following steps. A query is generated and transmitted to the source control module from the query. The query is generated based upon at least one pre-determined parameter corresponding to the software program code files during an execution of time based delta code coverage process. The pre-determined parameter corresponds to a modification time stamp (and target branch, when there are multiple branches in the source code repository) corresponding to each of the software program code files. The query is generated to retrieve the two versions of files which correspond to the beginning time and ending time of the time period.

The software program code files having the highest modification timestamps equal to or less than the time stamp specified by the query based on initial and target timestamp, of the corresponding the software program code files during the execution of time based delta code coverage process are retrieved from the source control module by a retriever.

The initial version of software program code file is compared with the specified or final versions of the corresponding software program code file in the predetermined time period with a comparator, to compute a difference between the retrieved initial version of software program code file and the target version of the corresponding software program code file in the predetermined time period, to generate a first comparison information during the execution of time based delta code coverage process. The first comparison information indicates the lines that are modified between the initial and target versions of the corresponding software program code files.

A delta code coverage information is generated by the processor by integrating the first comparison information with the corresponding code coverage data. The delta code coverage information indicates lines or branches that are modified and executed as well as a total number of modified lines and branches that are covered during the time based delta code coverage process.

According to an embodiment herein, the delta code coverage report is generated for each software program code file with the processor to highlight the changed line numbers in each file with a predefined color scheme or color code.

According to an embodiment herein, the path based delta code coverage process is performed for two sets of flies or folders to generate a delta code coverage data. According to an embodiment herein, the path based delta code coverage process is performed by the processor to generate a delta code coverage data for the lines or branches that are changed between the two versions specified by folder paths in one or more software program code file. According to an embodiment herein, the two specified versions includes an initial version, a target version or a specified version.

According to an embodiment herein, the delta code coverage data is generated in the path based delta code coverage process to indicate a patched code which is changed but not tested and requires attention and observation.

According to an embodiment herein, the path based delta code coverage process comprises retrieving a first path information corresponding to a path of the first released version of the software program code file and a second path information corresponding to a path of the patched version of the software program code file from the source control module by the retriever, during the execution of the path based delta code coverage process.

According to an embodiment herein, the path based delta code coverage process further comprises comparing the retrieved first path information and the second path information by a comparator to compute a difference between the first released version of the software program code file and the patched version of the software program code file to generate a second comparison data during the execution of the path based delta code coverage process to indicate the lines and branches that are changed between the between the first released version of the software program code file and the patched version of the software program code file, and the line numbers that are changed between the first released version of the software program code file and the patched version of the software program code file.

According to an embodiment herein, the delta code coverage information is generated in the path based delta code coverage process by integrating the second comparison information with the corresponding code coverage data. The delta code coverage information indicates a total number of modified lines and/or branches that are covered during the path based delta code coverage process.

These and other aspects of the embodiments herein will be better appreciated and understood when considered in conjunction with the following description and the accompanying drawings. It should be understood, however, that the following descriptions, while indicating the preferred embodiments and numerous specific details thereof are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
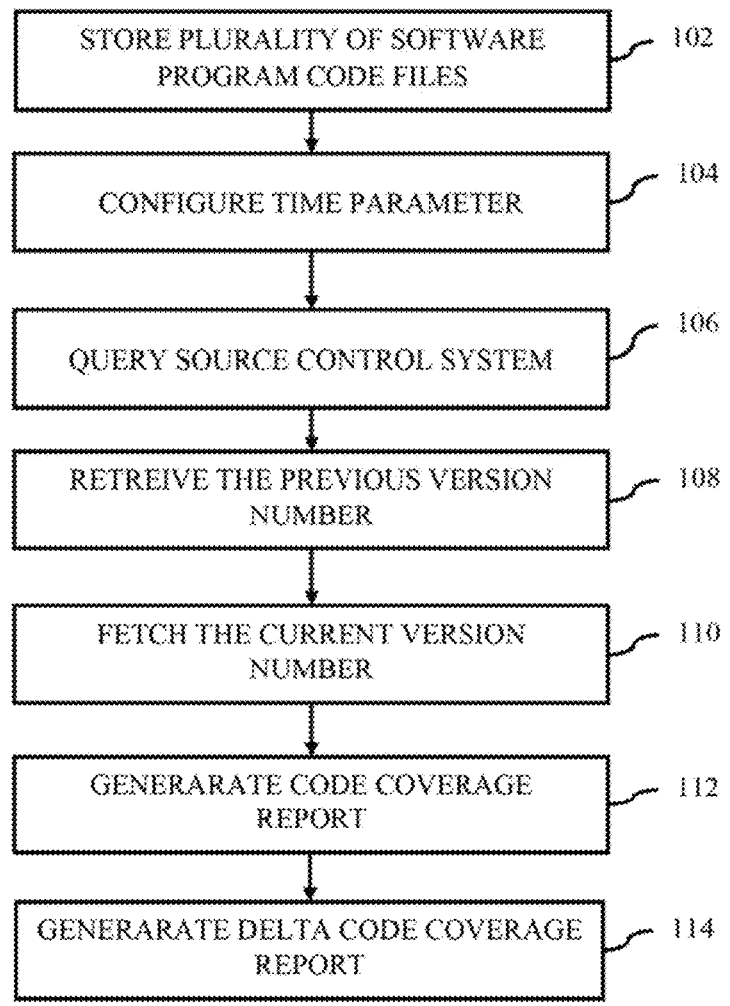
FIG. 1 illustrates a flowchart explaining a method for generating a time based delta code coverage report on line level, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown, by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for providing delta code coverage information. According to various embodiments herein, code coverage information refers to a measure that is used to describe the degree to which the source code of a program is tested by a particular test suite or a set of tests. According to an embodiment herein, the code coverage is a measurement of the number of lines, blocks, arcs of the code executed while the one or more tests are running. According to an embodiment herein, the coverage tool provides the percentage of the code that is executed, and allow the user to dig into the data and analyze which lines of code were executed during a particular test.

According to various embodiments herein, the term "Delta Code Coverage" refers to a subset of the full code coverage data for analysis. According to an embodiment herein, the delta code coverage includes more useful code coverage data for analysis. According to an embodiment herein, in the context of source code, one can compute the delta code coverage on line level or branch level. According to an embodiment herein, the delta code coverage at line level refers to examining and analyzing the execution of the changed line in the new version as compared to the old version.

According to an embodiment herein, the delta code coverage at branch level refers to examining and analyzing the execution of the changed branch in the new version as compared to the old version.

The system for generating delta code coverage information by processing code coverage information corresponding to software program code files comprises a source control module configured for storing a plurality of software program code files to be processed and a plurality of code coverage data corresponding to the plurality of software program code files, a processor configured to generate a delta code coverage data for analysis for each of the plurality of software program code files on a line level or at a branch level by performing a time based delta code coverage process and a path based delta code coverage process.

The delta code coverage data is a subset of full code coverage data for analysis. Further, the delta code coverage data on the line level indicates whether a line that is changed has been executed or not executed, and the delta code coverage data at a branch level indicates whether a branch that is changed has been executed or not executed. The time based delta code coverage process is executed to acquire the code coverage data that are changed within a preset time in one or more software program code files. The time based delta code coverage process is executed to acquire the delta code coverage of the source code files that are changed for a plurality of times in a preset time period to improve software quality of source code files. The preset time is set by a user, wherein a path based delta code coverage process is performed to obtain a delta code coverage with respect to a preset project folder to indicate patched codes to judge codes that are changed in a high frequency.

Further, the system comprises a query generator, a retriever, a comparator, and a processor. The query generator is configured to generate and transmit a query to the source control module. According to an embodiment herein, the query generated by the query generator is based upon at least one pre-determined parameter corresponding to the two versions of software program code files during an execution of time based delta code coverage process. The pre-determined time period start and time period end (and when the source code repository has multiple branches, then corresponding branch information parameter corresponds to a modification time stamp to each version of the software program code files.

According to an embodiment herein, the retriever configured to retrieve from the source control module, the appropriate version of software program, code files during the execution of the time based delta code coverage process.

According to an embodiment herein, the comparator is configured to compare a predetermined version of software program code file and the target version of the corresponding software program code file in the predetermined time period, to compute a difference between the retrieved predetermined version of software program code file and the target version of the corresponding software program code file in the predetermined time period, to generate a first comparison information during the execution of time based delta code coverage process. The first comparison information indicates a line number of new, modified, or deleted in the target version of the corresponding software program code when compared with the initial version of the software program code files when compared with the initial version of the software program code file. Similarly a branch level comparison of the two versions is done to generate the list of changed code branches.

According to an embodiment herein, the processor is configured to generate a delta code coverage information by integrating the first comparison information with the corresponding code coverage data. The delta code coverage information indicates whether a line or branch that has been changed between the initial and target version has been executed. According to an embodiment herein, the delta code coverage information indicate a total number of modified lines that are covered during the time based delta code coverage process and the number of branch statements of modified branches that are covered during the execution of the time based delta code coverage process.

According to an embodiment herein, a method for generating delta code coverage information by processing the code coverage information to software program code files is provided. The method comprises storing a plurality of software program code files in a source control module and receiving a corresponding code coverage data as a separate input, generating and transmitting a query to the source control module with a query generator, retrieving the software program code files based on the transmitted query from the source control module, processing the retrieved software program code files to generate a delta code coverage data for analysis for each of the plurality of software program code files on a line level or at a branch level or both by performing a delta code coverage process. The delta code coverage process includes a time based delta code coverage process or a path based code coverage process.

The method of generating time based code coverage process comprises generating and transmitting a query to the source control module from the query, wherein the query is generated based upon at least one pre-determined parameter corresponding to the software program code files during an execution of time based delta code coverage process, and wherein the pre-determined parameter corresponds to a modification time stamp corresponding to each of said software program code files, retrieving the software program code files having modification timestamps equal to or greater than the time stamp specified by the query, and current versions of the corresponding software program code files during the execution of time based delta code coverage process from the source control module by a retriever. The method further comprises comparing a predetermined version of software program code file and the current versions of the corresponding software program code file in the predetermined time period with a comparator, to compute a difference between the retrieved predetermined version of software program code file and the current version of the corresponding software program code file in the predetermined time period, to generate a first comparison information during the execution of time based delta code coverage process. The first comparison information indicates a line number of modified lines in the predetermined version of the software program code file, that are modified again in the current version of the corresponding software program code files, and wherein the predetermined version corresponds to a first modified version of the of software program code files in the pre-set time period.

The method further comprises generating a delta code coverage information by the processor by integrating the first comparison information with the corresponding code coverage data, and wherein the delta code coverage information indicates a total number of modified lines that are covered during the time based delta code coverage process, and number of branch statements of modified lines that are covered during the execution of the time based delta code coverage information.

According to an embodiment herein, the term "Delta Code Coverage" defines a subset of full code coverage data which includes more useful code coverage data for analysis.

In the context of source code, the delta code coverage on line level (whether a line which has been changed has been executed) or branch level (whether a branch which has changes has been executed) is computed. According to an embodiment herein, for illustration of overall concept, the details for delta line coverage is provided. Similar techniques are used for delta branch coverage. A separate link is provided to look this type of reports.

According to an embodiment herein, a Time Based Delta Code Coverage data is provided. In this way, a delta code coverage data based on time factor, for example, the code coverage data of those files which are changed in last 1 year is computed. The time factor is configurable so that the time factor is changed based on configuration parameters. This type of Code coverage data basically helps to look those source code files' code coverage which is changing recently to ensure that those files have good coverage and thereby helping in making good decision for the quality of the software. The idea is that the code that is changed more frequently requires a high attention for code coverage and the code that is not changed frequently requires less attention the codes are left untouched and working well.

According to an embodiment herein, an algorithm is provided for Time based Delta Code Coverage. The code is managed through source control systems like SVN, GIT, TFS Source Control, Mercurial, etc. Based on time parameter configurations, a query is passed to source control systems. When the time factor is set to "Last 1 Year" then the query is passed to the source control system to get a list of files which are changed in last 1 year.

Once the list of changed files are retrieved then the next step is to get the immediate first version number of each changed files and a last version number of each changed file in last 1 year. For example, if there is one file which is changed 3 times in last 1 year like changed before 10 Months, changed before 6 Months and changed before 2 Months, so the immediate first version number of that file is the version at the time of before 10 months, and this process is relatedly carried out for all changed files.

Once the immediate first version of each changed files in last 1 year (Or based on time configured) is acquired, then the next step is to get the last version of those each changed files in the last 1 year and then compute the difference between the immediate first versions of each changed files to the last version of the changed file in the last 1 year time period.

Once the differences like which are the line numbers of those changed files are changed, are collected, the collected details are recorded and related those data to the code coverage data such that the coverage data have information that how many line numbers of those changed line count are covered and also how many branch statements of those changed line numbers are covered and finally a summary table for those changed line numbers code coverage data is generated.

According to an embodiment herein, each changed file is highlighted as a separate report and highlight the changed line numbers as a different color scheme, when a code coverage report is generated based on the collected code coverage data and the summary table.

According to one embodiment herein, a Specific Path based Delta Code Coverage is obtained. In this process, a delta code coverage data is obtained with respect to a specific project folder. The typical use case is when a new version of software is released due to bug fixes, new features etc. So here with the use of this specific Project Folder delta code coverage feature, the new code is compared with a old version code to get the delta code coverage data of only that portion which are changed in the new version.

According to an embodiment herein, an algorithm for Specific Path based Delta Code Coverage is provided. For computing a specific path based delta code coverage data, 2 inputs are provided. The first input is the path of the Project Folder of the Released software version and the second input is the path of the Project Folder of the Patched software version.

Once those 2 path information is taken, the difference of file versions is computed and recorded that which are the files are changed between this 2 software versions and which are the line numbers which are changed.

Once the differences like which are the line numbers of those changed files are changed, are collected, then the collected differences are recorded and relate the recorded differences data to the code coverage data such that the code coverage data includes information that how many line numbers of those changed line count are covered and also bow many branch statements of those changed line numbers are covered and finally a summary table for those changed line numbers code coverage data is generated.

For example, the delta code coverage reports are generated based on the generated summary table during the generation of code coverage report. The each changed file is highlighted as a separate report and changed line numbers are highlighted as a different color scheme.

According to an embodiment herein, a delta code coverage between two versions of a set of files is specified by providing two versions of directory paths containing those files and the corresponding code coverage data. The two versions of the set of files are created by retrieving the desired two versions from the source control system (or any other manner). Also a method of calculating the delta branch coverage comprises creating the sematic tree for the source file for both versions, identifying the changed branches and then merging the code coverage data with the results.

FIG. 1 illustrates a flowchart indicating a method for generating a time based delta code coverage report on a line level, according to an embodiment herein. According to an embodiment herein, the line level code coverage information tracks the code corresponding to individual lines of source code. A time based delta code coverage refers to generating a code coverage report based on time factor. For example, the time based code coverage report provides the codes that are changed in last one year. For generating the code coverage report, and then a delta code coverage report, a first code set is received. The first code set is the received by a client device (not shown in figure). A second code set is received. According to an embodiment herein, the second code set includes a changed code as compared to the first code set. According to an embodiment herein, the first code set, and the second code set are written in a software programming language. According to one of the embodiments, the first code set and the second code set are received at different time intervals. According to another embodiment herein, the first code set and the second code set is received at the same time interval.

At the step 102, the plurality of the software program code files and the corresponding code coverage data are stored in the source control module. At step 104, a time parameter is configured for the one of the code sets. According to an embodiment herein, a time parameter is configured on the first code set. According to another embodiment herein, a time parameter is configured on the second code set. Example of a time period configured on the one of the code sets include, but are not limited to "Last one year", "Last six months", and the like. According to an embodiment herein, the time parameter is set using a software programming language. According to another embodiment herein, the time parameter is set using a non-programming language.

At step 106, once the time parameter is set, based on the set time parameter, a query is fired by the query generator to a source control module. According to an embodiment herein, the source control module refers to the management of changes to a plurality of the code sets, documents, large web sites, and collections of information. The query is fired to get a plurality of files that are changed within the set time parameter.

At step 108, the results for the fired query are retrieved. The results are retrieved by the processor. The results retrieved include but are not limited to a first version number, number of times the second code set is changed, and the like. For example, if there is a file that was changed three times in the defined time parameter, say one year, then a version number of the three set of files with a respective time stamp at which the code is changed, is retrieved.

At step 110, the first modified version and a last modified version or two preset modified versions of each changed files within the preset time parameter are obtained. The results are processed by the processor. Further, the difference between the retrieved first modified version and the last modified version in the pre-set time period or the difference between the two specified versions of each changed files is obtained.

At step 112, a code coverage report is generated. According to an embodiment herein, the code coverage report is generated at line level, i.e., the changes in the number of lines of code as compared to the received first code set. The code coverage report generated comprises the comparison between the changes in the lines of code between the first code set and the second code set. For example, the code coverage report has information such as, the number of changes in the line count, changes in one or more branch statements, changed line numbers, a summary table for the changed line numbers, and the like.

At step 114, a delta code coverage report is from the generated code coverage report. The delta code coverage report includes a highlight of each changed file as a separate report and a highlight the changed line numbers as a different color scheme. In an embodiment, the delta code coverage reports are generated in HTML format.

Figure 2:
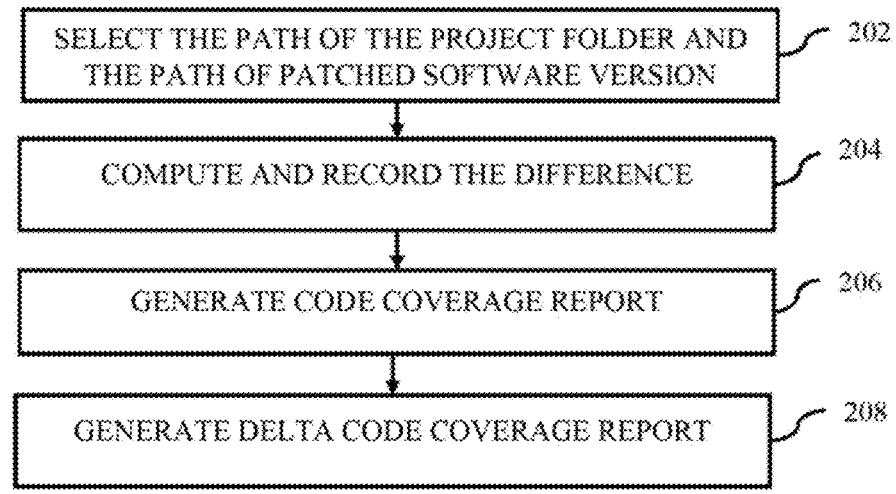
FIG. 2 illustrates a flowchart explaining a method for generating a specific path based delta code coverage report on line level, according to one embodiment herein.

FIG. 2 illustrates a flowchart explaining a method for generating a specific path based delta code coverage report on line level, according to an embodiment herein. In the specific path based delta code coverage, a code coverage report is generated in comparison to a specific project folder. A comparison between the initial version and the target version of the software is done to obtain a code coverage and a delta code coverage report.

At step 202, two inputs are selected. According to an embodiment herein, the two inputs include path of the project folder of the released software version and the second is the path of the project folder of the patched software version.

At step 204, the difference between the file versions of the two selected project folders is computed. According to an embodiment herein, the difference of the file versions of the selected project files is recorded and the line numbers that are changed. The difference between the two file versions is computed using one or more methods.

At step 206, a code coverage report is generated. According to an embodiment herein, the code coverage report comprises the line numbers of the plurality of the changed files, change in line count, change in branch statements, and a summary table for the changed line numbers code coverage data.

At step 208, a delta code coverage report is generated from the generated code coverage report. In the delta code coverage report, each changed file in plurality of the files is highlighted and is provided as a separate report. According to an embodiment herein, the changed line numbers are highlighted in a different color scheme. According to an embodiment herein, the changed line numbers are highlighted in a different typeset (font). Further, according to an embodiment herein, the delta code coverage report is generated in a HTML format.

Figure 3:
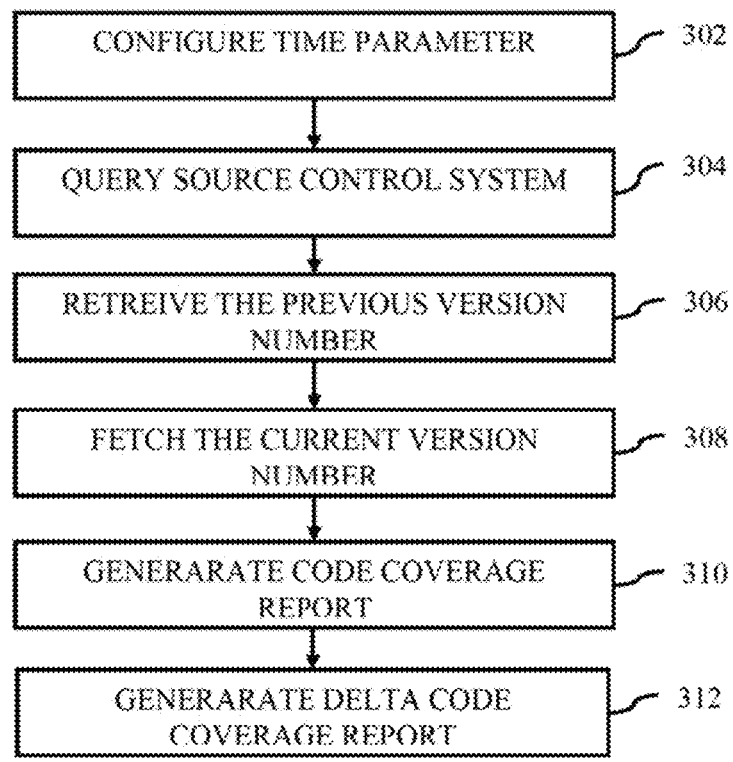
FIG. 3 illustrates a flowchart explaining a method for generating a time based delta code coverage report on branch level, according to one embodiment herein.

FIG. 3 illustrates a flowchart indicating a method for generating a time based delta code coverage report on branch level, according to an embodiment herein. Branch coverage is an advanced type of code coverage that requires all code blocks and all execution paths have been taken. For generating the code coverage report, and then a delta code coverage report, a first code set is received. The first code set is the received by a client device (not shown in figure). A second code set is received. According to an embodiment herein, the second code set includes a changed code as compared to the first code set. According to an embodiment herein, the first code set, and the second code set are written in a software programming language. According to an embodiment, the first code set and the second code set are received at different time intervals. According to another embodiment herein, the first code set and the second code set are received at the same time interval. The received code files are stored in the database by the source control module.

At step 302, a time parameter is configured for the one of the code sets. According to an embodiment herein, a time parameter is configured on the first code set. According to another embodiment herein, a time parameter is configured on the second code set. Example of a time period configured on the one of the code sets include, but are not limited, to "Last one year", "Last six months", and the like. According to an embodiment herein, the time parameter is set using a software programming language. According to an embodiment herein, the time parameter is set using a non-programming language.

At step 304, once the time parameter is set, a query is fired to a source control system based on the set time parameter. According to an embodiment herein, the source control system refers to the management of changes to a plurality of the code sets, documents, large web sites, and collections of information. The query is fired to get a plurality of files that are changed within the set time parameter window.

At step 306, the results for the fired query are retrieved. The results retrieved include but are not limited to a first version number, number of times the second code set is changed, and the like. For example, if there is a branch in a file that was changed three times in the defined time parameter, say one year, then a version number of that file when each of the time, the code set was changes is retrieved.

At step 308, the last modified or preset modified version of each changed files within the set time parameter is obtained. For example, if the files set time parameter is one year, then initial or first modified version of each changed file in one year is obtained. Further, the difference between the initial or first modified version and the last or target modified version of same file is obtained.

At step 310, a code coverage report is generated. According to an embodiment herein, the code coverage report is generated at branch level, i.e., the changes in the number of branches of code as compared to the received first code set. The code coverage report generated comprises the comparison between the changes in the branches of code between the first code set and the second code set. For example, the code coverage report has information such as, the number of changes in the branch count, changes in one or more branch statements, changed line numbers, a summary table for the changed line numbers, and the like.

At step 312, a delta code coverage report is from the generated code coverage report. The delta code coverage report includes highlight of each changed file as a separate report and highlight the changed branch numbers as a different color scheme. In an embodiment, the delta code coverage reports are generated in HTML format.

Figure 4:
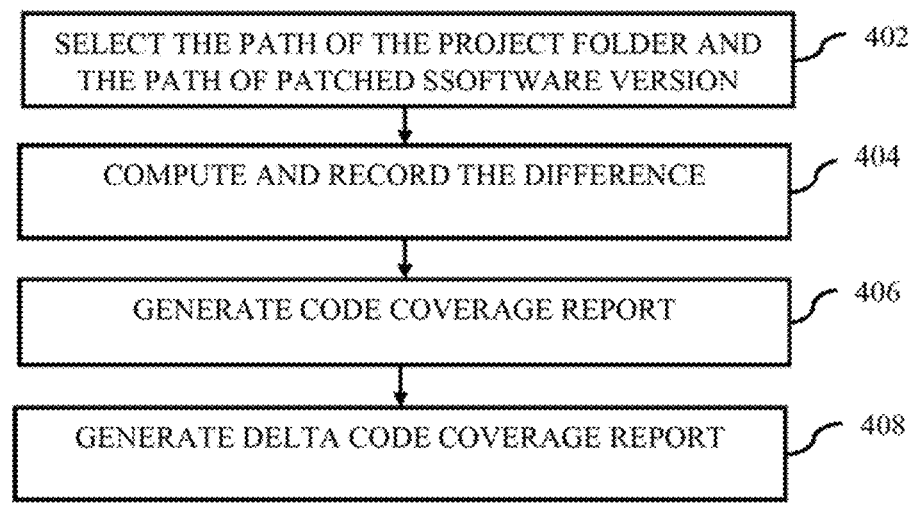
FIG. 4 illustrates a flowchart explaining a method for generating a specific path based delta code coverage report on branch level, according to one embodiment herein.

FIG. 4 illustrates a flowchart indicating a method for generating a specific path based delta code coverage report on branch level, according to an embodiment herein. In the specific path based delta code coverage, code coverage report is generated with comparison with to a specific project folder. The specific path based delta code coverage report is useful when software is released and later based on the inputs, patches are provided to fix a plurality of bugs or add or enhance new features. A comparison between the original version and the patched version of the software is done to obtain a code coverage and a delta code coverage report.

At step 402, two inputs are selected. According to an embodiment herein, the two inputs include path of the project folder of the released software version and the path of the project folder of the patched software version.

At step 404, the difference between the file versions of the two selected project folders is computed. According to an embodiment herein, the difference of the file versions of the selected project files is recorded and the line numbers that are changed. The difference between the file versions is computed using one or more methods.

At step 406, a code coverage report is generated. According to an embodiment herein, the code coverage report comprises the line numbers of the plurality of the changed files, change in line count, change in branch statements, and a summary table for the changed line numbers code coverage data.

At step 408, a delta code coverage report is generated from the generated code coverage report. In the delta code coverage report, each of the changed files in plurality of the files is highlighted and is provided as a separate report. According to an embodiment herein, the changed line numbers are highlighted in a different color scheme. According to an embodiment herein, the changed line numbers are highlighted in a different typeset (font). Further, according to an embodiment herein, the delta code coverage report is generated in a HTML format.

Figure 5:
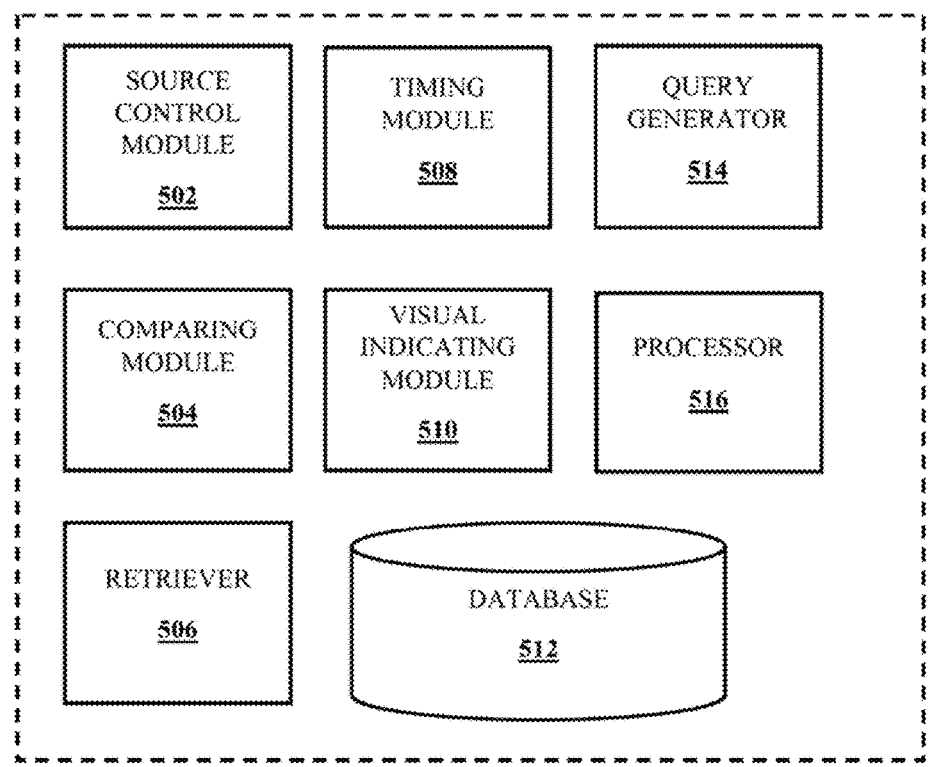
FIG. 5 illustrates a block diagram of a system for generating a delta code coverage report, according to one embodiment herein.

FIG. 5 illustrates a block diagram of a system for generating a delta code coverage report, according to an embodiment herein. The system includes a source control module 502. The source control module 502 is configured for storing a plurality of program code files. The code files include the first code set and the second code set for generating a delta code coverage report.

The system components include a comparison module 504. The comparison module 504 compares one or more code sets received by the receiving module 506 to compute the difference between the one or more code files. According to an embodiment, the comparing module 508 compares the difference between one or more code files at line level, branch level, or both.

According to an embodiment of the present invention, the comparison module 504 compare an initial version or pre-determined version of software program code file and the target versions of the corresponding software program code file in the predetermined time period, to compute a difference between the retrieved initial or predetermined version of software program code file and the target version of the corresponding software program code file in the predetermined time period, to generate a first comparison information during the execution of time based delta code coverage process. The first comparison information indicates a line number of new, modified or deleted in the target version of the corresponding soft ware program code files when compared with the initial version of the software program code file. Similarly a branch level comparison of the two versions can be done to generate the list of changed code branches.

The system components include a query generator 514. The query generator 514 is used for generating queries to retrieve data from a database for providing one or more desirable results. The query generator 514 generates and fires one or more queries to the source control module 502. Based on the query generated by the query generator module 514, the code coverage and the delta code coverage report is obtained. According to an embodiment herein, the parameter for generating one or more queries is set using the query generator 514. Further, the query generator 514 is used for modifying the one or more queries and the parameters set.

According to an embodiment herein, the query generator 514 generates the query based upon at least one pre-determined parameter corresponding to the two versions of software program code files during an execution of time based delta code coverage process. According to an embodiment herein, the pre-determined time period start and time period end (and when the source repository has multiple branches, then corresponding branch information) parameter corresponds to a modification time stamp corresponding to each version of the software program code files. According to an embodiment herein, the query generator 514 is communicably coupled to the processor and the processor is configured to process the two versions of the software program code files in accordance with the pre-determined criteria specified by the query generator 514.

The system components include a retriever 506. The retriever 506 is used for obtaining data from a database. According to the embodiments herein, the retriever 506 is configured to retrieve data from the source control module 502. Further, the retriever 506 retrieves the software program codes having modification timestamps. The modification timestamps is either equal to or greater than the timestamp specified by the query. Furthermore, the retriever 506 retrieves the two different versions (initial version and final modified version within a preset time period) of the corresponding software program files during the execution of time based and specified path based delta code coverage process. According to an embodiment herein, the retrieved data is highlighted with the changes in one or more ways. In an embodiment, the retrieved data is highlighted in a separate color code. In another embodiment, the retrieved data is highlighted in a different typeset (font).

The system components include a timing module 508. The timing module 508 is used for configuring the time parameter in the time-based approach. According to an embodiment herein, the timing module 508 is configured for setting limited time constraint. According to another embodiment herein, the timing module 508 is configured for setting any time constraint.

The system components include a visual indicating module 510. The visual indication module 510, is used for indicating the changes in the file made for generating the delta code coverage report. According to an embodiment herein, the visual indication module 510 is configured to highlight the report in one or more visually varied schemes.

The system components include a database 512. The database 512 is used for storing one or more type of data. Examples of the data stored by the database 512 include but are not limited to the one or more code sets, code coverage report, delta code coverage report, metadata, and the like.

The system components include a processor 516. Examples of the processor 516 include but not limited to one or more general purpose processors, a hardware such as programmable logic devices, application specific integrated circuits, and the like. In some embodiments, the units can be embodied by a form of software products which can be stored in a non-volatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

According to an embodiment herein, the processor 516 is configured to perform the path based delta code coverage process to generate a delta code coverage data with respect to a preset project holder, when client bugs patches are provided to a software program code file after releasing the software program code file. Further, the processor 516 is configured to compare a patched code of the software program code file to a first released version code of a software program code file to generate a delta code coverage data of a portion the software program code file. The portion of the software program cod file is changed in patches.

According to an embodiment herein, the processor 516 is configured to generate a delta code coverage information by integrating the first comparison information with the corresponding code coverage data. According to an embodiment herein, the delta code coverage information indicates whether a line or branch, or both that has been changed between the initial or target version has been executed.

According to an embodiment herein, the processor 516 is configured to generate a delta code coverage report for each software program code file identifying changed line numbers in each file and the code coverage for the changed line. In an embodiment herein, this information is indicated by highlighting the code with a predefined color scheme or color code.

Further, the processor 516 is configured to compare changed version of code the software program code file to a first released version code of a software program code file, and the portion of the software program code file is changed in the new version.

The embodiments herein enables to obtain is the total code coverage of each of the modified file. The system and method generates a code coverage report of the one or more modified file is obtained. Further the coverage of the modified lines at abstract level is obtained.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to full there between.

What is claimed is:

1. A computer implemented system provided with a hardware processor for running instructions stored on a non-transitory computer readable storage medium and a memory for generating delta code coverage information by processing code coverage information corresponding to software program, code files using one or more algorithms, the system comprising:

a source control module run on the hardware processor and configured for storing a plurality of software program code files to be processed and a plurality of code coverage data corresponding to the plurality of software program code files;

a processing module run on the hardware processor configured to generate a delta code coverage data for analysis for each of the plurality of software program code files on a line level or at a branch level by performing a preset process, and wherein the preset process includes a time based delta code coverage process and a path based delta code coverage process;

a retriever module run on the hardware processor and configured to retrieve a first path information corresponding to a path of an initial version of the software program code file and a second path information corresponding to a path of a target version of the software program code file from a source control module during an execution of the path based delta code coverage process;

a comparator module run on the hardware processor and configured to compare the retrieved first path information and the second path information to compete a difference between the initial version of the software program code file and the target version of the software program code file to generate a second comparison data during the execution of the path based delta code coverage process to indicate the tiles that are changed between the initial version of the software program code tile and the target version of the software program code file, and the line numbers that are changed between the initial version of the software program code file and the target version of the software program code file;

wherein the delta code coverage data is a subset of full code coverage data for analysis, and wherein the delta code coverage data on the line level indicates whether a line that is changed between the initial and the target versions has been executed, and wherein the delta code coverage data at a branch level indicates whether a branch that is changed between the initial and target versions has been executed, and wherein the processor is configured to compare a patched code of the target version of the software program code file with a code of the initial version of the software program code file to generate a delta code coverage data for the lines or branches that are changed between the two versions specified by folder paths in one or more software program code file, and wherein the processor is configured to generate a delta code coverage information by integrating the second comparison information with a corresponding code coverage data and wherein the delta code coverage information indicates a total number of modified lines that are covered during the time based delta code coverage process and the number of branch statements of modified lines that are covered during the execution of the path based delta code coverage process, and wherein the processor is configured to generate a delta code coverage report for each software program code file to identify changed line numbers in each file and code coverage for the changed line and wherein the code is highlighted with a predetermined color scheme or color code.

2. The system according to claim 1, wherein the processing module is run on the hardware processor and configured to execute the time based delta code coverage process to acquire the code coverage data for the lines that are changed within a preset time in one software program code file, wherein the time based delta code coverage process is executed to acquire the delta code coverage of source code files that are changed for a plurality of times in a preset time period and wherein the preset time is configured or customized by the user.

3. The system according to claim 1, wherein the processing module is run on the hardware processor and configured to execute a path based delta code coverage process to obtain a delta code coverage with respect to a preset project folder to acquire delta code coverage for changed lines in source files and which are changed between the initial and target versions of those files as represented by the two paths.

4. A computer implemented system provided with a hardware processor for running instructions stored on a non-transitory computer readable storage medium and a memory for generating delta code coverage information by processing code coverage information corresponding to software program program code files using one or more algorithms, the system comprising:

a source control module run on the hardware processor and configured for storing a plurality of software program code files to be processed and a plurality of code coverage data corresponding to the plurality of software program code files;

a processing module run on the hardware processor and a configured to generate a delta code coverage data for analysis for each of the plurality of software program code files on a line level or at a branch level by performing a time based delta code coverage process and a path based delta code coverage process;

a retriever module run on the hardware processor and configured to retrieve a first path information corresponding to a path of an initial version of the software program code file and a second path information corresponding to a path of a target version of the software program code file from a source control module during an execution of the path based delta code coverage process;

a computer module run on the hardware processor and configured to compare the retrieved first path information and the second path information to compute a difference between the initial version of the software program code file and the target version of the software program code file to generate a second comparison data during the execution of the path based delta code coverage process to indicate the files that are changed between the initial version of the software program code file and the target version of the software program code file, and the line numbers that are changed between the initial version of the software program code file and the target version of the software program code file;

wherein the delta code coverage data is a subset of full code coverage data for analysis, and wherein the delta code coverage data on the line level indicates whether a line that is changed has been executed, and wherein the delta code coverage data at a branch level indicates whether a branch that is changed has been executed, and wherein the time based delta code coverage process is executed to acquire the code coverage data that are changed within a preset time in one software program code file, wherein the time based delta code coverage process is executed process is executed to acquire the delta code coverage of source code files that are changed for a plurality of times in a preset time period and wherein the preset time is configured or customized by the user to change a configuration parameter, and wherein the time based delta code coverage process is executed to acquire a frequency of change of codes in the preset time, and wherein a path based delta code coverage process is performed to obtain a delta code coverage with respect to a preset project folder to indicate delta code coverage at line and branch levels for the lines which are changed in two versions, and wherein the processor is configured to compare a patched code of the target version of the software program code file with a code of the initial version of the software program code file to generate a delta code coverage data for the lines or branches that are changed between the two versions specified by folder paths in one or more software program code file, and wherein the processor is configured to generate a delta code coverage information by integrating the second comparison information with a corresponding code coverage data and wherein the delta code coverage information indicates a total number of modified lines that are covered during the time based delta code coverage process and the number of branch statements of modified lines that are covered during the execution of the path based delta code coverage process, and wherein the processor is configured to generate a delta code coverage report for each software program code file to identify changed line numbers in each file and code coverage for the changed line and wherein the code is highlighted with a predefined color scheme or color code.

5. The system according to claim 4, wherein the processing module is run on the hardware processor and configured to perform the path based delta code coverage process to obtain a delta code coverage with respect to a preset project folder to acquire delta code coverage for changed lines which are changed between the two versions of those files as represented by the two paths, and wherein the two versions are an initial version and a target version or a preset modified version and target version.

6. The system according to claim 4, wherein the processing module is run on the hardware processor and configured to generate a delta code coverage information by integrating the second comparison information with the corresponding code coverage data, and wherein the delta code coverage information indicates a total number of modified lines that are covered during the time based delta code coverage process, and number of branch statements of modified lines that are covered during the execution of the path based delta code coverage process.

7. A computer implemented method comprising instructions stored on a non-transitory computer readable storage medium executed on a hardware processor in a computing device provided with a memory, for generating delta code coverage information by processing code coverage information corresponding to software program code files using one or more algorithms, the method comprising steps of:
storing a plurality of software program code files and a corresponding code coverage data in a source control module;
generating and transmitting a query to the source control module with a query generator,
retrieving the software program code files with a retriever module based on the transmitted query from the source control module;
processing the retrieved software program code files in a processing module to generate a delta code coverage data for analysis the each of the plurality of software program code files on a line level or at a branch level by performing a time based delta code coverage proves and a path based delta code coverage process;
wherein the delta code coverage data is a subset of full code coverage data for analysis, and wherein the delta code coverage data on the line level indicates whether a line that is changed between the initial and the target versions has been executed, and wherein the delta code coverage data at a branch level indicates whether a branch that is changed between the initial and the target versions has been executed, and wherein the time based delta code coverage process is executed to acquire the code coverage data that are changed within a preset time in one software program code file, and wherein the time based delta code coverage process is executed to acquire the delta code coverage of source code files that are changed for a plurality of times in a preset time period, and wherein the preset time is configured or customized by the user to change a configuration parameter, and wherein the time based delta code coverage process is executed to acquire the frequency of change of codes in the preset time, and wherein the path based delta code coverage process is performed to obtain a delta code coverage with respect to a preset project folder to indicate delta code coverage at line and branch level for the lines which are changed in two versions, and wherein the path based delta code coverage process is performed by the processor to generate a delta code coverage data with respect to a preset project holder and wherein the processor is configured to compare a patched code of the target version of software program code file with a code of the initial version a software program code file to generate a delta code coverage data for the lines or branches that are changed between the two versions specified by folder paths in one or more software program code file, and wherein the two specified versions includes an initial version, a target version or a specified version, and wherein a delta code coverage report for each software program code file is generated to identify changed line numbers in each file and code coverage for the changed line and wherein the code is highlighted with a predefined color scheme or color code.

8. The method as claim 7, wherein the time based delta code coverage process comprising steps of:
generating and transmitting a query to the source control module from the query generator module, wherein the query is generated based upon at least one pre-determined parameter corresponding to the software program code files during an execution of time based delta code coverage process, and wherein the pre-determined parameter corresponds to a modification time stamp corresponding to each of said software program code files;
retrieving two versions of the software program code files based on the modification time stamps during the execution of time based delta code coverage process from the source control module by the retriever module, and wherein the two versions are an initial modified version and a target version or a modified version with a preset time stamp and a a target version;
comparing the two versions of software program code file in the predetermined time period with a comparator module, to compute a difference between the two versions of software program code file in the predetermined time period, to generate a first comparison information during the execution of time based delta code coverage process, and wherein the first comparison information indicates a line number of added or deleted or modified lines in the initial or predetermined version of the software program code file, that are modified again in the target version of the corresponding software program code files;

generating a delta code coverage information by the processor by integrating the first comparison information with the corresponding code coverage data, and wherein the delta code coverage information indicates a total number of modified lines that are covered during the time based delta code coverage process, and number of branch statements of modified lines that are covered during the execution of the based delta code coverage process.

9. The method as claimed in claim 7, wherein the path based delta code coverage process comprises retrieving a first path information corresponding to a path of the initial version of the software program code file and a second path information corresponding to a path of the target version of the software program code file from the source control module by the retriever module, during the execution of the path based delta code coverage process.

10. The method as claimed in claim 7, wherein the path based delta code coverage process further comprises comparing the retrieved first path information and the second path information by a comparator module to compute a difference between the initial version of the software program code file and the target version of the software program code file to generate a second comparison data during the execution of the path based delta code coverage process to indicate the files that are changed between the initial version of the software program code file and the target version of the software program code file, and the line numbers that are changed between the initial version of the software program code file and the target version of the software program code file.

11. The method as claimed in claim 7, wherein the delta code coverage information is generated in the path based delta code coverage process by integrating the second comparison information with the corresponding code coverage data, and wherein the delta code coverage information indicates a total number of modified lines that are covered during the time based delta code coverage process, and number of branch statements of modified lines that are covered during the execution of the path based delta code coverage process.

* * * * *